UNITED STATES PATENT OFFICE.

WILLIAM J. ARMBRUSTER, OF ST. LOUIS, MISSOURI.

PIGMENT AND PROCESS OF MAKING SAME.

No. 841,303.  Specification of Letters Patent.  Patented Jan. 15, 1907.

Application filed November 8, 1902. Renewed June 3, 1905. Serial No. 263,649.

*To all whom it may concern:*

Be it known that I, WILLIAM J. ARMBRUSTER, a citizen of the United States, residing at St. Louis, State of Missouri, have invented certain new and useful Improvements in Pigments and Processes of Making the Same, of which the following is a specification.

My invention has relation to pigments and improved processes of making the same; and it consists, respectively, in the novel product and series of steps more fully set forth in the specification and pointed out in the claims.

Broadly stated, the product is a composite precipitate of barium sulfate and aluminium hydrate produced by the reaction taking place when solutions of barium hydrate and aluminium sulfate are brought together.

The pigment made according to my process is in a state of fine division and molecular mixture impossible to obtain by any other method. The product is a highly superior one, being smooth and amorphous and especially adapted for art chrome papers. It can be produced readily and with the simplest of means, consisting only in bringing the two solutions of barium hydrate and aluminium sulfate together, preferably in equivalent proportions, when the precipitate is formed immediately. After it has been allowed to settle the surplus water is drained away and the precipitate recovered. The pigment can be washed, if desired, and can be used or marketed in wet paste form or filter-pressed and thoroughly dried and marketed in dry form.

The equation in illustration of the reaction is as follows:

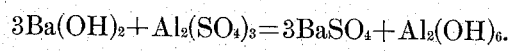

$$3Ba(OH)_2 + Al_2(SO_4)_3 = 3BaSO_4 + Al_2(OH)_6.$$

In the markets of commerce an impure sulfate of aluminium can be had, called "alum cake," consisting of aluminium sulfate and silica. It is prepared by digesting with the aid of heat finely-powdered kaolin or china clay—silicate of aluminium—in sulfuric acid. The sulfuric acid combines with the aluminium, setting free the silica; but this freed silica is allowed to remain in mechanical admixture when the solution is evaporated to a solid condition. The silica thus in mechanical mixture is usually very white in the first instance; but it is generally desirable that the alum cake should be free from all traces of iron. In the course of the preparation of the alum cake the silica has been ground very fine. If such alum cake is used as the source of the aluminium sulfate, the presence of the finely-powdered silica does not constitute an objection where a finest quality pigment is not desired. When the alum cake is dissolved in water for obtaining the aluminium sulfate solution, the silica will be freed and precipitated. This need not be separated if it is a fine white article; but if the aluminium sulfate contains an objectionable quantity of iron impurity it can be eliminated very conveniently at this stage, and after such elimination of the iron the barium sulfate and aluminium hydrate can, if desired, be precipitated directly upon the silica, or the solution of aluminium sulfate can be drained from the freed silica and then mixed with the barium hydrate solution.

The precipitated pigment can, if desired, have its aluminium hydrate constituent converted to aluminium oxid by submitting the precipitate to calcination until the aluminium hydrate loses its water of combination as follows:

$$Al_2(OH)_6 = Al_2O_3 + 3H_2O.$$

If it is desired to have a precipitate in which barium sulfate is preponderant, this can be accomplished by adding to the barium hydrate additional equivalents of a different barium-salt solution and adding corresponding equivalents of an alkaline sulfate to react with the additional barium-salt equivalents. For instance, as illustrated in the following equation, I use barium chlorid to furnish the additional barium-salt equivalents and sodium sulfate as the alkaline sulfate,

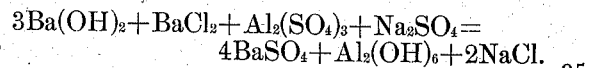

$$3Ba(OH)_2 + BaCl_2 + Al_2(SO_4)_3 + Na_2SO_4 = 4BaSO_4 + Al_2(OH)_6 + 2NaCl.$$

or, if it is desired to obtain a precipitate in which the aluminium hydrate is in preponderant equivalency it can be accomplished by increasing the relative ratio of aluminium sulfate or other soluble aluminium salt and adding an alkali hydrate to react with such an increased proportion of aluminium-salt solution as follows:

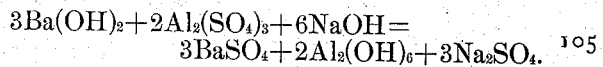

$$3Ba(OH)_2 + 2Al_2(SO_4)_3 + 6NaOH = 3BaSO_4 + 2Al_2(OH)_6 + 3Na_2SO_4.$$

Freshly-precipitated aluminium hydrate has a strong affinity for certain coloring-matters, such as madder and a large number of the coal-tar colors, forming "lakes" with them, and the pigment produced according to my invention will therefore work felicitously with such coloring-matters. In fact, the process lends itself admirably to forming or "striking" the lake color simultaneously with the formation of the composite pigment.

The formation of a pure lake pigment, as usually practiced in the arts, is effected by bringing together a solution of a certain coloring-matter with a solution of a precipitant, which, reacting with the coloring-matter in solution, precipitates it as a lake pigment. Among such precipitants are barium chlorid and aluminium sulfate, tannic acid, and lead nitrate, and advantage is also taken of the affinity of aluminium hydrate for certain coloring-matters, the aluminium hydrate being usually formed in the presence of the coloring-matter by reaction between an aluminium-salt solution and a hydrate of an alkali metal. More often, instead of pure lakes being produced, the lake pigment is formed and precipitated upon a neutral base, the main object being thereby to extend the pigment and lessen the cost of the product. Finely-pulverized and bleached barytes, (barium sulfate,) precipitated barium sulfate, gypsum, whiting, and china clay are used as such bases or "extenders." In general practice the base is diffused in water, the coloring-matter added and well mixed, and the precipitant solution added, when the color is struck and the pigment allowed to subside and recovered. A pigment so made, however, is much lacking in good qualities for reasons plainly apparent to one skilled in the art, but especially due to the bases being not so well adapted for the purpose and the mechanical difficulty of obtaining an exceedingly thorough admixture. In the highest state of the art the inert base of precipitated barium sulfate is formed in the presence of the aluminium hydrate by bringing together solutions of aluminium sulfate and sodium carbonate, (or hydrate,) adding the coloring-matter, and when the aluminium hydrate is formed adding barium-chlorid solution, the reactions occurring being the formation of aluminium hydrate and sodium sulfate, the latter then reacting with the barium chlorid, to form the barium sulfate. This process also suffers from defects, the pigments not being formed simultaneously, the use of a free caustic alkali creating chemical difficulties of itself or by an insufficiency or excess and the use of an alkali-metal carbonate having first to precipitate the basic sulfate of aluminium and then the normal hydrate, thereby requiring often that the alkali carbonate be added in several portions instead of one single portion, the whole operation being complicated and the result often unsatisfactory. A few of the applications of the process and product of my invention, in connection with the formation of the lake pigments, will be mentioned. In the case of an adjective coal-tar coloring-matter—such as alizarine, which is not precipitated by aluminium sulfate, (but is precipitated by aluminium hydrate, which acts as a mordant,)—the coloring-matter solution is mixed in solution with the aluminium sulfate and this mixed with the barium-hydrate solution, when barium sulfate and aluminium hydrate are formed immediately in molecular intermixture, the aluminium hydrate at once striking or precipitating the color of the lake pigment, the whole being obtained in a state of intimate intermixture impossible to obtain in any other manner. Obviously the respective solutions can be brought together by permitting the three solutions—that is, the barium hydrate, aluminium sulfate, and the alizarine—to flow from their respective containers simultaneously into a larger container or any two of the solutions to flow simultaneously into a container containing the third solution. The form of my process wherein I produce a predominancy of aluminium-hydrate precipitate is also well adapted in this case.

If the coloring-matter is an azo or acid color, such as is precipitated by barium chlorid, the coloring-matter can be mixed with either the barium hydrate or the aluminium-sulfate solution, as may best fit the case. The form of my process wherein I use the additional equivalents of barium-salt solution in the form of chlorid is also well adapted in this case, as the barium chlorid can be used simply in excess sufficient to "strike" the color. If the coloring-matter solution is mixed with the aluminium-sulfate solution, the barium-hydrate and chlorid solutions can be mixed together, as these do not react on each other, and the mixed solutions of aluminium sulfate with the coloring-matter is then added to the mixed solutions of barium hydrate and chlorid, when the barium sulfate and aluminium hydrate are formed simultaneously and the color struck at the same time by the barium chlorid present, the whole being formed simultaneously in most intimate mixture. The manner of bringing the solutions together can, however, be varied.

In the case of coloring-matter precipitated by aluminium sulfate, yet not by barium hydrate, the coloring-matter may be mixed with the barium-hydrate solution and the aluminium-sulfate solution used in sufficient excess over the quantity required to react with the barium-hydrate solution to precipitate the coloring-matter, or the three separate solutions of aluminium sulfate, barium hydrate, and coloring-matter can be brought together simultaneously or any two allowed to flow into the third, aluminium-sulfate solution being of course used in sufficient excess to precipitate or strike the color. It will also be seen that the acetate and nitrate-of-lead and tannic-acid precipitants, which are also much used as precipitants in the formation of lake pigments, can readily be used in connection with my pigment and process of making, except that generally it will be advisable not to allow the lead-salt solutions to react with the aluminium-sulfate solution, producing lead sulfate, before the color is struck. Where it is desired, however, to lighten the tone of the color of the lake pigment, some excess of lead-salt solution and aluminium sulfate can be used, thereby producing some lead-sulfate precipitate, which, having more body or tinting power than the other constituents of the pigment, will have the effect of lightening the color of the lake pigment, yet retaining the brilliancy and avoiding a chalky effect, such as is produced by most other of the usual pigment-bases. When lead-salt or tannic-acid precipitants are used, probably the best and safest practice for general use will be to prepare the solutions of aluminium sulfate, barium hydrate, the precipitant, and the coloring-matter in separate containers in proper proportions and allow any three of them to flow simultaneously into the fourth solution.

In illustration of actual practice in the production of the composite pigment, consisting of barium sulfate and aluminium hydrate, the following may be cited: Separate aqueous solutions of barium hydrate five hundred and thirteen (513) pounds and aluminium sulfate three hundred and forty-two (342) pounds are prepared and mixed together, when a precipitate of eight hundred and fifty-five (855) pounds will be formed, consisting of six hundred and ninety-nine (699) pounds of barium sulfate and one hundred and fifty-six (156) pounds of aluminium hydrate in an intimate state of mixture, the precipitate being recovered as before indicated. The proportions or weights given are based on anhydrous salts. Where hydrous salts are used, the water of crystallization should be allowed for and proportionately greater quantities used. I may of course invoke the doctrine of chemical equivalents wherever the same may be applicable.

Ordinary ground barytes or precipitated barium sulfate (blanc fixe) used alone as inert bases or extenders are not perfectly adapted for pulp (water-paste) colors, owing to the fact that they retain very little water and soon become dry. Aluminium hydrate, on the other hand, owing to its gelatinous naure, retains much water, renders the colors easier to work, and does away with the stiffness and hardness of the pulp. It also adds brilliancy and fastness to the pigment and modifies the weight of the pigment by somewhat counterbalancing the barium sulfate, which, used alone, is rather excessive in weight. The precipitated barium sulfate, on the other hand, gives body and opacity and other good characteristics lacking in the aluminium hydrate. The formation then of these two valuable constituents in most intimate relation, by reason of the reaction under which they are prepared in my process, produces a pigment of great value.

From the foregoing it will be seen that the base of my new composition is a composite precipitate of aluminium hydrate and barium sulfate, said base being extended by means of colors capable of precipitation either as lakes concurrently with the formation of the constituents of said base or by colors adapted to be struck or fixed by one of the solutions, contributing to the formation of the base or by a precipitant totally distinct from such solution. In either case the lake so formed or the color so fixed becomes intimately mixed with the base by reason of the substantial simultaneity of formation therewith. By the term "precipitation" as applied to the colors I mean either the formation of a lake as defined in the arts or as the fixing of the color by the reagent acting as a mordant.

Having described my invention, what I claim is—

1. The process of making pigment which consists in preparing separate solutions of barium hydrate and aluminium sulfate, then mixing the same, and recovering the resulting precipitates, substantially as set forth.

2. The process of making pigment which consists in preparing separate solutions of barium hydrate and aluminium sulfate, then mixing the same in the presence of color solutions permitting the simultaneous precipitation of aluminium hydrate and barium sulfate, and recovering said precipitates, substantially as set forth.

3. The process of making pigment which consists in mixing solutions of barium hydrate and aluminium sulfate in the presence of a color solution adapted to be fixed as a lake, substantially as set forth.

4. The process of making pigment which consists in mixing solutions of barium hydrate and aluminium sulfate in the presence of a color solution precipitable by either of the reagents thus mixed, substantially as set forth.

5. The process of making pigment which consists in mixing solutions of barium hydrate and aluminium sulfate in the presence of a color solution precipitable concurrently with the composite precipitate of aluminium hydrate and barium sulfate, thus formed, substantially as set forth.

6. The process of making pigment which consists in mixing solutions of barium hydrate, and aluminium sulfate in the presence of salt solutions, and solutions of colors precipitable concurrently with the aluminium-hydrate and barium-sulfate precipitates formed, substantially as set forth.

7. The process of making pigment which consists in mixing solutions of barium hydrate and aluminium sulfate and a color solution, in the presence of reagents permitting the concurrent precipitation of aluminium hydrate, barium sulfate, and the formation of a lake, substantially as set forth.

8. A pigment composed of a composite precipitate of aluminium hydrate and barium sulfate formed from a mixture of separate solutions of barium hydrate and aluminium sulfate, substantially as set forth.

9. A pigment composed of a mixture of aluminium hydrate and barium sulfate precipitated from solutions of barium hydrate and aluminium sulfate, and a coloring-matter struck concurrently with the formation of the precipitates, substantially as set forth.

10. A pigment composed of a simultaneously-formed composite precipitate of aluminium hydrate, barium sulfate, and fixed coloring-matter, substantially as set forth.

In testimony whereof I affix my signature in presence of two witnesses.

WILLIAM J. ARMBRUSTER.

Witnesses:
 EMIL STAREK,
 G. L. BELFRY.